United States Patent [19]

Ortlieb

[11] 4,043,229
[45] Aug. 23, 1977

[54] SELF-RETRACTING TOOL

[75] Inventor: Robert M. Ortlieb, Southfield, Mich.

[73] Assignee: DeVlieg Machine Company, Royal Oak, Mich.

[21] Appl. No.: 673,642

[22] Filed: Apr. 5, 1976

[51] Int. Cl.² .............................................. B23B 21/00
[52] U.S. Cl. .................. 82/24 A; 82/36 R; 29/96; 408/151; 408/180
[58] Field of Search ............... 408/150, 151, 180, 187; 82/36 R, 24 A; 29/96

[56] References Cited

U.S. PATENT DOCUMENTS

| | | | |
|---|---|---|---|
| 2,211,321 | 8/1940 | Eipper | 408/151 |
| 2,269,320 | 1/1942 | Rosborough | 408/180 |
| 3,277,753 | 10/1966 | Angst | 82/36 R |

*Primary Examiner*—Leonidas Vlachos
*Attorney, Agent, or Firm*—Harness, Dickey & Pierce

[57] ABSTRACT

There is disclosed a self-retracting tool holder assembly for mounting a tool on a machine in a predetermined location with respect to a workpiece, the assembly incorporating a tool holder mounted for pivotal movement about an axis so arranged that when the tool is fed by the machine into engagement with the workpiece the forces created by such engagement will cause the tool holder to pivot about said axis to advance the tool into a seated machining position in which the machining portion of the tool is displaced into the workpiece both in the feed direction and in a direction at right angles thereto, and spring means to automatically retract the tool to an inactive position out of engagement with the workpiece when the feed of the tool stops, whereby when the tool is returned by the machine the tool will not cause a drag line to be formed on the just-machined surface of the workpiece.

29 Claims, 9 Drawing Figures

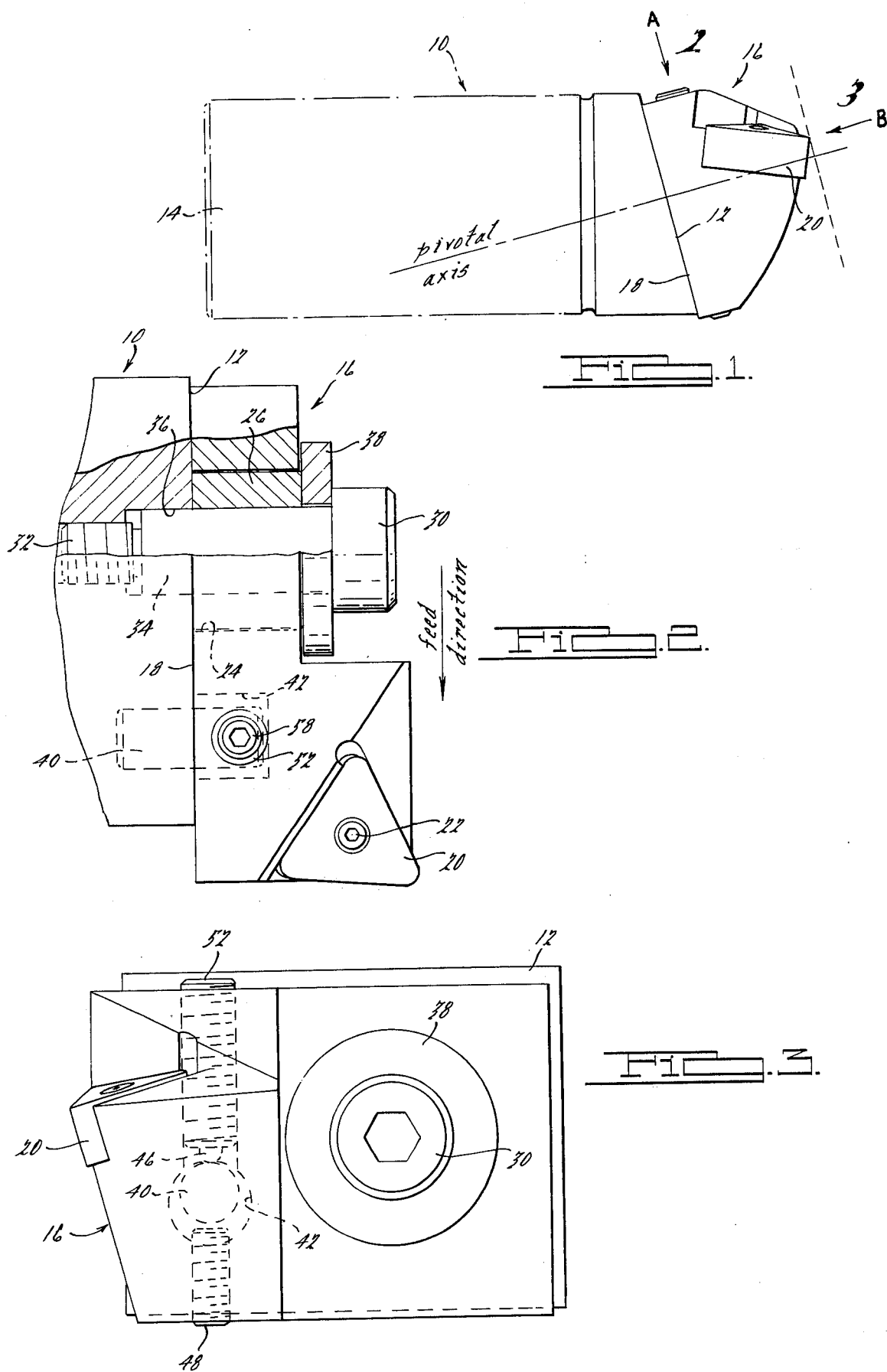

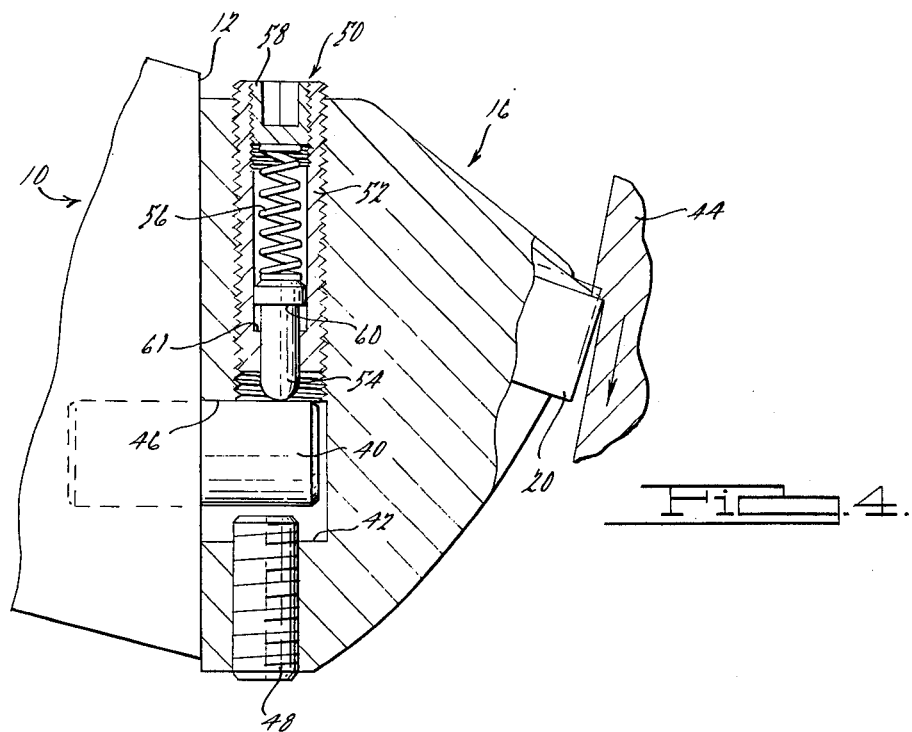
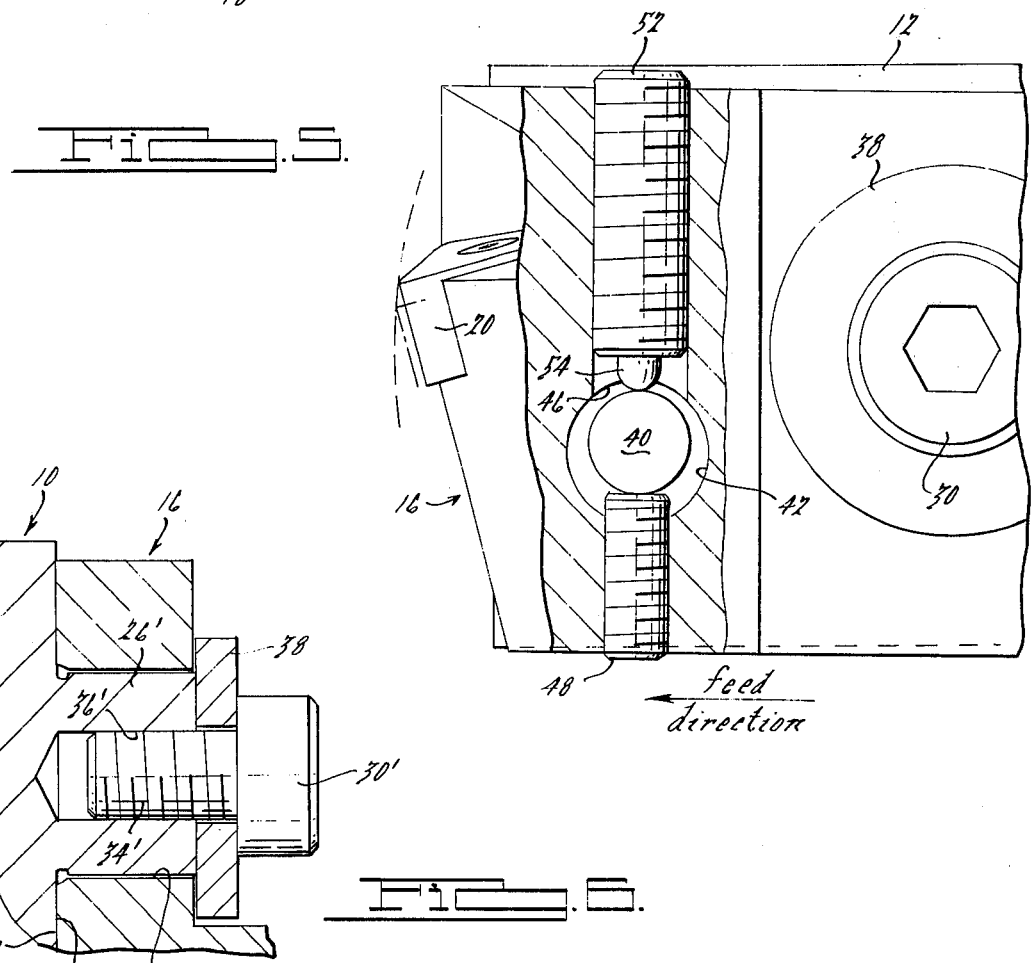

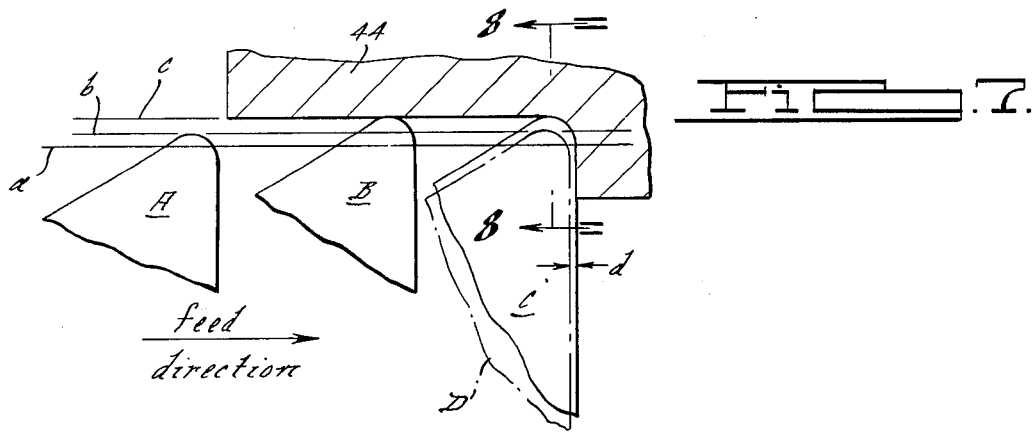
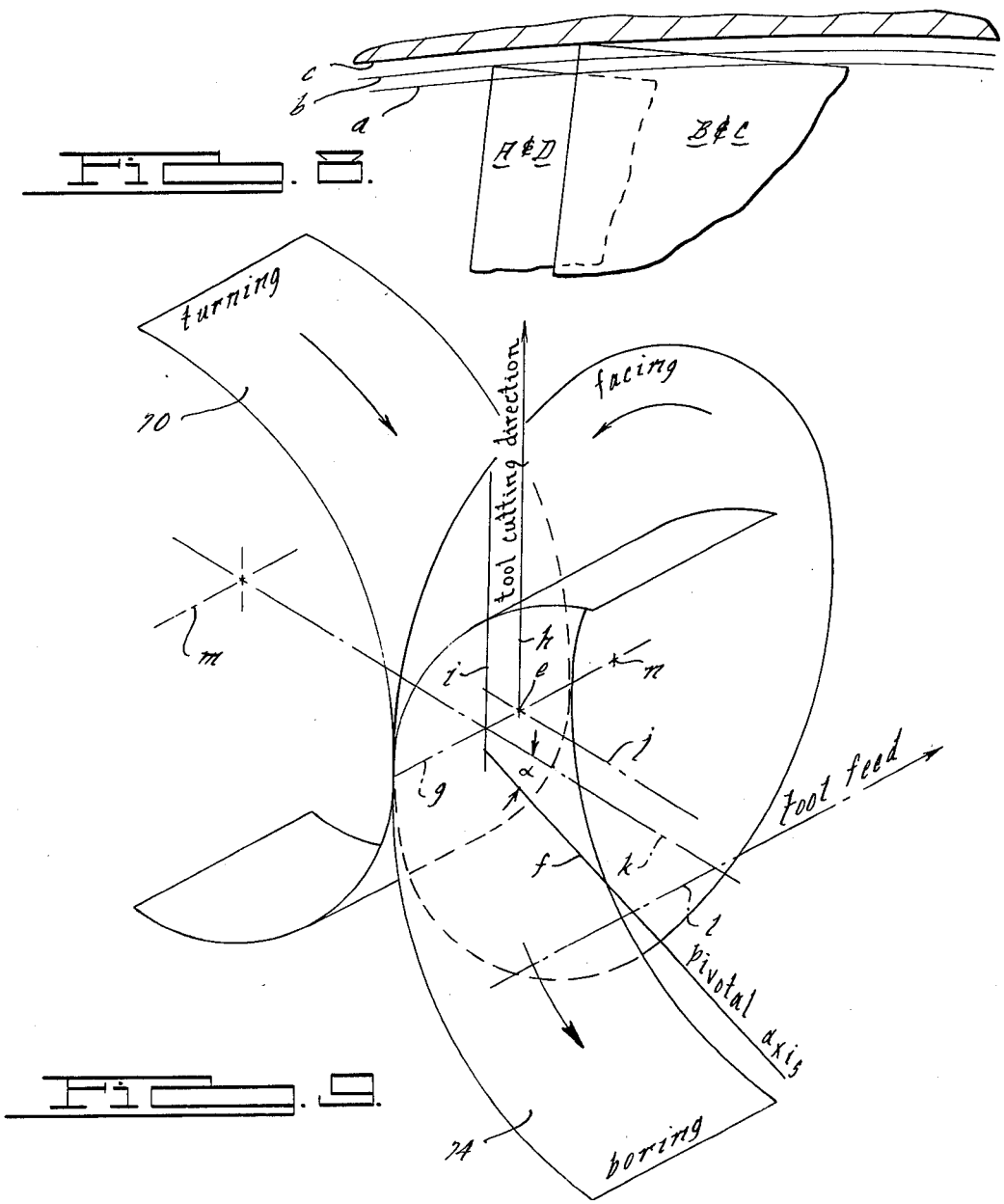

SELF-RETRACTING TOOL

BACKGROUND AND SUMMARY OF THE INVENTION

One problem that has plagued machinists for years is the drag line which is frequently left on a machined surface when the tool is returned after completion of a machining operation. This line, which is sometimes also referred to as a draw line or a witness line, is caused by the fact that when the tool is traversing the workpiece surface during machining the entire machine is under substantial stress, and upon completion of the machining operation the suddenly unstressed components of the machine assume a slightly different position in which there may be slight interference between the tool and the just-machined surface, whereupon when the tool is returned by reversing the feed it leaves a shallow spiral across this surface. Drag lines are also caused due to the fact that most machined surfaces are not totally flat but comprise a series of small ridges and valleys, and withdrawal of the tool, without also moving it away from the workpiece, causes it to intersect these ridges with the result that the just-machined surface again may have a noticeable shallow spiral formed thereon. This type of problem is encountered in numerous machining operations, including boring, facing and turning operations.

One way to avoid drag line formation is to move the tool away from the machined surface upon completion of the machining operation and prior to returning it, however this adds an undesirable step to the machining sequence. Other techniques have evolved for eliminating this problem but most of them have one disadvantage or another. For example, some are not applicable to boring, turning and facing on a universal basis, some do not permit a live return of the spindle in the case of a boring operation, some do not permit boring against a shoulder without leaving a drag line or chatter marks on the shoulder, some require manual actuation by an external power source, some do not permit the use of multiple tools in a single operation, and like disadvantages.

It is therefore a primary object of the present invention to provide an improved an improved tool holding assembly which is relatively simple and inexpensive in construction and which overcomes most if not all of the aforesaid disadvantages of prior art devices for avoiding drag lines. More specifically, objects of the present invention reside in the provision of such an assembly which permits live return of the spindle at normal operating speeds when performing boring operations on a boring machine, which permits boring, facing and turning operations, which permits boring against shoulders without a dwell at the end of the feed and without chattering, which is fully self-actuated by engagement with the workpiece and self-retracting to an inactive position by virtue of internal spring means, which permits withdrawal or return of the tool during a machining operation for measuring and then continuance of the machining operation with minimal evidence of interruption on the machined surface, within normal machining parameters, which permits the use of multiple tools in a single machining operation because the self-retracting means are a part of each individual tool, and like advantages; all without forming a drag line on the machined surface, even if it includes a shoulder, and without moving the tool away from the machined surface prior to return.

A further object of the present invention resides in the provision of a structure of the aforedescribed type which is so designed that it is not subject to malfunction due to the lodging of machined chips or like foreign matter within the working parts thereof, thus insuring reliability even in the most adverse environments.

These and other objects, features and advantages of the present invention will become apparent from the subsequent description and the appended claims, taken in conjunction with the accompanying drawings.

BRIEF DESCRIPTION OF THE DRAWINGS

FIG. 1 is a side elevational view, partly in phantom, illustrating a tool holder assembly embodying the principles of the present invention in its machining position;

FIG. 2 is an enlarged fragmentary plan view of the tool holder assembly of FIG. 1 as viewed in the direction of Arrow A in FIG. 1, with parts broken away;

FIG. 3 is an enlarged end elevational view of the tool holder assembly of FIG. 1 as viewed in the direction of Arrow B in FIG. 1;

FIG. 4 is an enlarged fragmentary side-elevational view of the right-hand portion of the assembly of FIG. 1 with parts broken away to show the internal structure of the mechanism, and also illustrating the manner in which the tool cooperates with a workpiece during machining.

FIG. 5 is an enlarged fragmentary view similar to FIG. 3 but with parts broken away to show the mechanism in its inactive position when a machining operation is not being performed.

FIG. 6 is an enlarged fragmentary sectional view of a portion of the assembly illustrating a modified manner of construction;

FIG. 7 is a diagrammatic illustration of the mode of operation of the tool holder assembly of the present invention;

FIG. 8 is a sectional view taken generally along line 8—8 in FIG. 7; and

FIG. 9 is a diagram illustrating the geometry of the present invention.

DETAILED DESCRIPTION OF THE PREFERRED EMBODIMENT

Referring to FIG. 1, the tool holder assembly comprises generally a base portion 10 having an accurately ground flat inclined end surface 12 and a shank portion 14 which may be of any suitable construction for mounting the device in the conventional manner to a machine tool. For example, shank 14 may be threaded for a cartridge-type application or it may be simply a solid bar of round, square, rectangular, triangular or like cross-sectional configuration adapted to be clamped in a suitable tool holder clamp on a machine tool. Its details of construction form no part of the present invention. At the forward end of base member 10 there is disposed a tool holder 16 having an accurately ground flat surface 18 engaging surface 12, and supporting in a conventional manner a tool 20. Any type of tool may be affixed to the tool holder in any conventional manner and for exemplary purposes there is illustrated a standard carbide insert tool nested in a complementary contoured recess in the tool holder and retained in place by a screw 22. Other types of tools having different modes of attachment may be utilized, as the invention is not limited to the type of tool or its mode of attachment.

The heart of applicant's invention resides in the manner in which tool holder 16 is pivotally connected to base member 10 for relative rotation with respect thereto about a predetermined axis of rotation. As best shown in FIGS. 2 and 3 this pivotal connection is effected by means of an aperture 24 in tool holder 16 in which is disposed for minimal pivotal clearance a spacer or sleeve 26 through which passes a pivotal element 28 having at its outer end a head 30 and at its inner end a threaded portion 32 threadably disposed within an appropriate threaded aperture in base member 10. The center portion of pivotal element 28, indicated at 34, is fitted with a very close pivotal clearance with respect to the inside diameter of the spacer and with an accurately formed coaxially aligned hole 36 in base member 10. The minimum pivoting clearances provided between the tool holder, spacer and pivotal element provide relative pivotal movement between the tool holder and base member with a minimum of looseness. Also provided is a washer 38 between head 30 and the outer surface of tool holder 16 in order to retain the latter in tight but pivotally sliding engagement with surface 12 of the base member. Spacer 26 is formed of a length such that when pivotal element 28 is tightly screwed into the position illustrated in FIG. 2, a minimal sliding clearance will exist between washer 38 and the outer surface of tool holder 16, thus eliminating any looseness or movement along the pivotal element 28. The pivotal axis of the assembly is so arranged as to be perpendicular to surface 12 and 18, and is shown in FIG. 1. The angular extent of the relative pivotal movement of the tool holder with respect to the base member is controlled in the manner best illustrated in FIGS. 3 - 5. As can be seen, base member 10 is provided with a hardened stop pin 40 projecting perpendicularly from surface 12, the projecting end of stop pin 40 being received within a circular recess 42 having a diameter greater than that of the stop pin. The parts are so arranged that when tool 20 engages a workpiece, such as indicated at 44 in FIG. 4, the forces created by such engagement actuate the tool holder 16 to cause it to pivot around the pivotal axis of pivotal element 28, in a counterclockwise direction as viewed in FIG. 3, until stop pin 40 engages the upper wall of recess 42, as illustrated at 46 in FIGS. 3 and 4, and the tool is in its machining position. Rotational movement of the tool holder with respect to the base member in the opposite direction is limited by engagement of the opposite side of stop pin 40 with an adjustable stop screw 48, preferably of the locking type, disposed within a suitably located threaded opening in tool holder 16, as best illustrated in FIG. 4. The parts are shown retracted to this inactive position in FIG. 5.

The parts are maintained in a normal inactive position, as indicated in FIG. 5, by means of an adjustable spring assembly indicated generally at 50 in FIG. 4. Assembly 50 comprises a threaded element 52 threadably disposed within a suitable threaded bore in tool holder 16 and is provided with a hollow interior in which is slidably disposed a plunger 54, the free end of which is biased against pin 40 by means of a compression spring 56 also disposed within element 52. The amount of spring bias exerted by spring 56 may be controlled by an adjusting screw 58 threadably disposed in the end of element 52. The threaded connections between screw 58 and element 52 and between the latter and tool holder 16 are preferably of the locking type. Plunger 54 and element 52 are provided with cooperating shoulders, such as indicated at 60 and 61, respectively, to maintain plunger 54 within element 52 and yet permit the desired degree of travel. As can thus be seen, in the absence of any forces created by the interaction of a tool and a workpiece, spring 56 will cause the tool holder to automatically retract by pivoting to its inactive position illustrated in FIG. 5. As can be seen, the arrangement of such that pivotal movement is limited by means not exposed to the debris created by and during a machining operation.

For an assembly of the type illustrated, the feed direction during machining would be to the left as the tool is viewed in FIG. 5. The dashed arcuate line in FIG. 5 illustrates the path of movement of the cutting portion of the tool when the tool holder pivots with respect to the base member. There is also shown in phantom the position of this portion of the tool when it is in its machining position. Thus, as can be visualized, when the assembly pivots from its inactive position (solid lines) to its machining position (phantom lines) the point of the tool moves into the workpiece in the feed direction. When feeding is stopped so that the tool is no longer cutting unmachined material and is thus no longer urged into its machining position, spring 56 will automatically bias the tool to its inactive position out of contact with the workpiece. Furthermore, with reference to FIG. 1, it can be seen that pivotal movement of the assembly will cause the point of the tool to also move along the inclined dashed line shown at the right of the figure, this line being parallel to surfaces 12 and 18 and perpendicular to the pivotal axis of the device. Thus, as can be visualized, pivotal movement of the tool to its machining position will cause the tool to also move directly into the workpiece, i.e., from the phantom line position to the solid line position as illustrated in FIG. 4. Therefore, when the machining portion of the tool supported in the assembly of the present invention engages an unmachined portion of the workpiece it is moved by the forces created by such engagement into the workpiece in two directions, i.e., directly into the workpiece and also into the workpiece in the feed direction.

The interaction of the tool and the workpiece whereby drag lines are eliminated is clearly illustrated in FIG. 7 wherein workpiece 44 can represent either a workpiece being bored, in which case the surface being machined is an inside diameter, a workpiece being turned, in which case the surface is an outside diameter, or a workpiece being faced, in which case the surface being machined is an end surface. Prior to machining the surface to be machined is disposed along line $a$ and the tool is disposed in position A. The cutting portion of the tool must be positioned so that when it is fed into the workpiece it will engage same. In the illustrated example the tip of the tool is positioned so that it will move along line $b$, which is disposed below the unmachined surface. As soon as the tool is fed to the point where it engages the workpiece the forces created by such engagement cause the tool to immediately move from its inactive position to its machining position, i.e., further into the workpiece to line $c$, and also into the workpiece in the feed direction. Position $B$ shows the tool during machining. As feeding continues the tool removes material until it either clears the workpiece or the feed thereof is stopped, as at position C, where the surface has been machined up to a shoulder. With the feed stopped, as soon as the tool has traversed the entirety of the surface being machined in that position there is no longer sufficient force created by engagement with the workpiece to overcome the bias of spring 56, whereupon the tool automatically self-retracts under the influence of spring 56 to its inactive position indicated in phantom lines at position D. In this position it is not only retracted from the cylindrical or flat surface being machined along line c, but in addition it is retracted from the shoulder which has just been machined. The tool may thereafter be returned by merely reversing the feed and without additional displacement, and because the tip of the tool is now wholly spaced from the machined surface there is no possibility of a drag line being formed. This relationship is also shown, for a boring operation, in FIG. 8. Both FIGS. 7 and 8 are greatly enlarged and exaggerated to demonstrate the principles involved. If the operation in question is a turning operation lines a, b and c in FIG. 8 would be convex and concentric with one another rather than concave as shown for boring. If the operation is a facing operation these lines would be straight and parallel to one another, as can be clearly visualized.

Spring 56 preferably has a rate and a preload which is great enough to rotate the tool holder back to its inactive position, and to overcome any centrifugal force resisting such movement in the case of rotating tool holder. On the other hand it must not be so great that it cannot be overcome by the forces created by engagement of the tool with the workpiece to move the tool to its machining position. When the tool holder is mounted in a spindle operating at above-design speeds, self-retraction may be assured by merely using a dead spindle return.

The geometry of the present invention is best illustrated with reference to FIG. 9. Reference numeral 70 indicates a cylindrical surface having a center axis $m$ outside of which is adapted to be machined in a turning operation with the surface 70 moving in the direction of the arrow with respect to the point of contact of surface 70 with the tip of tool 20, which point of contact during machining is indicated at $e$. Reference numeral 72 indicates a flat surface moving in the direction indicated with respect to the tool during a facing operation, and 74 indicates a cylindrical surface the inside of which is being machined at position $e$ in a boring operation. The center axis of surface 74 is indicated at $l$ and the center of movement of surface 72 with respect to the tool is indicated at $n$. The tool is positioned on the viewer's side of point $e$ and although the surfaces are illustrated as moving with respect to a fixed took, in any machine application the mode of operation may be reversed wherein the surface being machined remains stationay and the tool moves with respect thereto, all in accordance with conventional parameters. For example, in a lathe turning operation surface 70 would rotate about axis $m$ and the tool would not rotate or revolve, in a boring mill operation surface 74 would remain fixed and the tool would be rotated about axis $l$. If boring was done on a lathe then surface 74 would rotate about axis $l$ and the tool would not rotate. In a conventional facing operation surface 72 would rotate about its center $n$ and the tool would not. In all of these operations relative movement between the tool and the surface being machined is referred to as movement in the "cutting direction." In all modes of operation the tool is also fed relative to the workpiece to traverse the surface being machined, the direction of feed in all cases being parallel to axis $l$ and being herein referred to as the "feed direction."

The advantages uniquely obtained by the present invention are in great part due to the geometry of the location of the pivotal axis of the tool holder, which pivotal axis is represented by line $f$ in FIG. 9. It is the disposition of this axis which permits the tool to automatically self-retract at the completion of a machining operation both directly away from the workpiece and away from the workpiece in a counter-feed direction, so that when the feed of the tool is reversed to return the tool no drag line will be formed on the machined surface. As can be seen in FIG. 9, lines $l$ and $m$ are parallel to one another and also to a line $g$ which lies in all of the machined surfaces and passes through the point of tool engagement at $e$. Line $g$ actually represents the path of travel of the tool as it is fed across the surface being machined. Line $k$ is a reference line which is perpendicular to lines $m$, $g$ and $l$. Because it passes through axes $l$ and $m$ it is also perpendicular to the machined surface along line $g$. Line $h$ is perpendicular to line $g$, passes through engagement point $e$, and lies in the plane of the machined surface at the point of engagement, i.e., a plane perpendicular to line $k$. Line $j$ is also perpendicular to this plane, is parallel to line $k$ and passes through engagement point $e$. Line $i$ is parallel to line $h$, which indicates the cutting direction of the tool with respect to the machined surface, and passes through the intersection of lines $k$ and $g$.

Pivotal axis $f$ is disposed below the plane of lines $g$ and $k$, as bounded by the machined surface, and preferably lies in the plane defined by lines $k$ and $i$, this plane being perpendicular to tool feed axis. Axis $f$ is preferably inclined with respect to line $k$ by an angle alpha. Angle alpha provides for the component of movement of the tool perpendicular to the machined surface as the tool holder assembly moves between its inactive and machining positions. For a turning operation alpha may be equal to or greater than zero, the former being possible because the machined surface falls away from the point of engagement $e$. For a facing operation alpha must be greater than zero for there to be any retraction of the tool upon completion of the machining. For boring, angle alpha should be substantially greater than zero because the workpiece overhangs at the point of engagement. For a universally applicable tool, alpha should be chosen such that it has a high enough value that the tool will clear the overhanging workpiece for the minimum diameter contemplated in a boring operation, accounting also for the deflection of the tool and tool supporting structure and the imperfect nature of the machine surface, (i.e., ridges and the like). On the other hand, alpha should not be so great that the tool will not engage the workpiece for a given depth of cut during a turning operation. Furthermore, if the value of alpha is too high then the forces created by engagement of the tool with the workpiece will tend to cause surfaces 12 and 18 to clamp together to a greater extent than they will tend to cause the desired rotation of the tool holder. Accordingly, it is believed that the operable range of values of alpha are from 0° to approximately 35°, with the preferred range being approximately 10° to 25 . Applicant has had very successful results with a tool of the type shown having an angle alpha of 15° for performing boring operations on a workpiece having an inside diameter of approximately 2 inches. Feeds, speeds, depths of cut, materials, tool and the like all may be chosen in accordance with standard criteria for the operation at hand.

In addition, pivotal axis *f* should intersect the plane defined by lines *h, i* and *g* at a point at or below line *g* in FIG. 9, i.e., at a point spaced from engagement point *e* in the cutting direction of movement of the workpiece with respect to the tool. This space is the distance between line *k* and the intersection of lines *f* and *i* in FIG. 9. This provides the component of movement of the tool towards and away from the workpiece in the tool feed direction.

Pivotal axis *f* should also lag or trail point of engagement *e* in the direction of tool feed to create the componenet of movement of the tool into the workpiece in the feed direction when the tool is pivoted from at its inactive to its machining position. This lag is represented by the distance between lines *h* and *i* in FIG. 9.

In FIG. 6 there is illustrated a modified arrangement for pivotally connecting tool holder 16 to base member 10. In this embodiment, instead of using a spacer 26 an annular projection 26' is formed integrally with base member 10. Projection 26' is provided with a tapped hole 36' in which a pivotal element having head 30' and a threaded portion 34' is threadably disposed. This embodiment functions in exactly the same manner as the previous one with minimum sliding clearance being provided between projection 26' and bore 24 in tool holder 16, and between washer 38 and the outer face of tool holder 16 in order to minimize any looseness or non-rotational play between the parts.

Thus, there is disclosed in the above description and in the drawings an improved tool holder assembly which fully and effectively accomplishes the objectives thereof. However, it will be apparent that variations and modifications of the disclosed embodiments may be made without departing from the principles of the invention or the scope of the appended claims.

I claim:

1. A tool holder assembly for mounting a tool on a machine in a predetermined location with respect to a workpiece to perform a machining operation on the workpiece, wherein the portion of the surface of the workpiece being machined and the work performing portion of the tool move relative to one another in a cutting direction and in a feed direction at right angles thereto, the tool holder assembly comprising:
   a base member adapted to be affixed to the machine;
   a tool holder having means for rigidly mounting the tool thereon;
   mounting means for pivotally mounting said tool holder to said base member for pivotal movement of said portion of the tool between first and second positions,
   said mounting means being operable to permit movement of said tool portion to said second position in response to the forces created by the engagement of said tool portion and the surface to be machined,
   said second position being spaced from said first position in the direction of movement of the tool with respect to the workpiece in said feed direction; and
   stop means for limiting further pivotal movement of said tool holder when said tool portion moves from said first position to said second position.

2. A tool holder assembly as claimed in claim 1, further comprising retracting means for pivoting said tool holder back to said first position of said tool portion when the machining operation terminates.

3. A tool holder assembly as claimed in claim 2, wherein said retracting means comprises spring means biasing said tool portion to said first position.

4. A tool holder assembly as claimed in claim 1, wherein said workpiece moves in said cutting direction while said assembly is arranged to move said tool only in said feed direction during machining.

5. A tool holder assembly as claimed in claim 1, wherein said workpiece is stationary and said assembly is arranged to move said tool in both said cutting direction and said feed direction during machining.

6. A tool holder assembly as claimed in claim 1, further comprising means for automatically retracting said tool portion from said second position to said first position whenever said forces cease.

7. A tool holder assembly as claimed in claim 1, wherein the axis of said pivotal movement is substantially perpendicular to said feed direction.

8. A tool holder assembly as claimed in claim 7, wherein said axis is slightly off normal to a plane which is parallel to said cutting direction and said feed direction and includes the point of engagement of said tool portion with said workpiece during machining.

9. A tool holder assembly as claimed in claim 1, wherein the axis of said pivotal movement lags the point of engagement of said tool portion and the surface being machined in said feed direction.

10. A tool holder assembly as claimed in claim 1, wherein said second position is also spaced from said first position in a direction toward the workpiece.

11. A tool holder assembly for mounting a tool on a machine in a predetermined location with respect to a workpiece to perform a machining operation on the workpiece, wherein the portion of the surface of the workpiece being machined and the work performing portion of the tool move relative to one another in a cutting direction and in a feed direction at right angles thereto, the tool holder assembly comprising:
   a base member adapted to be affixed to the machine;
   a tool holder having means for rigidly mounting the tool thereon;
   mounting means for pivotally mounting said tool holder to said base member for pivotal movement of said portion of the tool between first and second positions,
   said mounting means being operable to permit movement of said tool portion to said second position in response to the forces created by the engagement of said tool portion and the surface to be machined,
   the axis of said pivotal movement intersecting a plane which is parallel to said cutting direction and said feed direction and includes the point of engagement of said tool portion with said workpiece during machining; and
   stop means for limiting further pivotal movement of said tool holder when said tool portion moves from said first position to said second position.

12. A tool holder assembly as claimed in claim 11, further comprising retracting means for pivoting said tool holder back to said first position of said tool portion when the machining operation terminates.

13. A tool holder assembly as claimed in claim 12, wherein said retracting means comprises spring means biasing said tool portion to said first position.

14. A tool holder assembly as claimed in claim 11, wherein said axis intersects said plane at a point spaced from said point of engagement in said cutting direction of relative movement of the workpiece with respect to said tool portion.

15. A tool holder assembly as claimed in claim 14, wherein said axis lags the point of engagement of said tool portion and the surface being machined in said feed direction.

16. A tool holder assembly as claimed in claim 11, wherein said axis intersects said plane at a point spaced from a line parallel to said feed direction and including said point of engagement.

17. A tool holder assembly as claimed in claim 16, wherein said axis trails the point of engagement of said tool portion and the surface being machined in said cutting direction.

18. A tool holder assembly as claimed in claim 11, wherein said axis is generally perpendicular to said plane.

19. A tool holder assembly as claimed in claim 11, wherein said axis is disposed at an angle of from approximately 0° to 35° with respect to a line perpendicular to said plane.

20. A tool holder assembly as claimed in claim 11, wherein said axis is disposed at an angle of from approximately 10° to 25° with respect to a line perpendicular to said plane.

21. A tool holder assembly as claimed in claim 11, wherein said axis is parallel to or converges upon a second plane in a direction towards the workpiece, said second plane being perpendicular to said first-mentioned plane and parallel to said feed direction and including said point of engagement.

22. A tool holder assembly as claimed in claim 21, wherein said axis converges upon said second plane.

23. A tool holer as claimed in claim 22, wherein said axis is perpendicular to said feed direction.

24. A tool holder assembly as claimed in claim 23, wherein said axis converges on said second plane at an inclined angle of from approximately zero degrees to 35 degrees.

25. A tool holder assembly as claimed in claim 11, further comprising means for automatically retracting said tool portion from said second position to said first position whenever said forces cease.

26. A tool holder assembly as claimed in claim 11, wherein the axis of said pivotal movement lags the point of engagement of said tool portion and the surface being machined in said feed direction.

27. A tool holder assembly as claimed in claim 26, wherein said axis intersects said plane at a point spaced from said point of engagement in said cutting direction of relative movement of the workpiece with respect to said tool portion.

28. A tool holder assembly for mounting a tool on a machine in a predetermined location with respect to a workpiece to perform a machining operation on the workpiece, the tool holder assembly comprising:
a base member adapted to be affixed to the machine;
a means defining a flat surface on said base member;
a tool holder having means for rigidly mounting the tool thereon;
means defining a flat surface on said tool holder;
mounting means for pivotally mounting said tool holder to said base member with said flat surfaces slidingly engaging one another,
said surfaces being inclined at an angle with respect to the longitudinal axis of the assembly;
means defining a recess communicating with one of said surfaces;
a stop member projecting from the other of said surfaces into said recess,
said recess being larger than said stop member so that said stop member can move in said recess as said tool holder pivots with respect to said base member; and
stop means in said recess adapted to engage said stop member for limiting said pivotal movement of said tool holder in one direction.

29. A tool holder assembly as claimed in claim 28, wherein said angle is approximately 65° to 80°.

* * * * *